United States Patent [19]

Sonntag

[11] Patent Number: 5,604,497
[45] Date of Patent: Feb. 18, 1997

[54] APPARATUS AND METHOD FOR INCREASING DENSITY OF RUN LENGTH LIMITED BLOCK CODES WITHOUT INCREASING ERROR PROPAGATION

[75] Inventor: Jeffrey L. Sonntag, Rockland Township, Berks County, Pa.

[73] Assignee: Lucent Technologies Inc., Murray Hill, N.J.

[21] Appl. No.: 540,510

[22] Filed: Oct. 10, 1995

[51] Int. Cl.$^6$ .................................................. H03M 7/42
[52] U.S. Cl. ........................ 341/59; 341/58; 341/50; 341/51
[58] Field of Search ........................ 341/50, 51, 58, 341/59, 87, 95; 360/40, 48

[56] References Cited

U.S. PATENT DOCUMENTS

| | | |
|---|---|---|
| 4,707,681 | 11/1987 | Eggenberger et al. . |
| 5,099,237 | 3/1992 | Fitingof ........................ 341/59 |
| 5,150,379 | 9/1992 | Baugh et al. .................. 375/14 |

Primary Examiner—Jeffrey A. Gaffin
Assistant Examiner—Jason H. Vick

[57] ABSTRACT

The present invention is an apparatus and method for increasing the density of run-length-limited (RLL) block codes without increasing error propagation. By inserting a number of uncoded bytes (M) between each coded byte, the coding density is thereby increased. Starting with an RLL code with a block length (I) which is, for example, a multiple of 8, a number (M) of uncoded bytes may be inserted between each coded byte. The resulting density is: (I+8M)/(J+8M), wherein the resulting k constraint, of the (d,k,l) constraints is increased by 8M, and the resulting l constraint is increased by 4M. For example, starting with an RLL code having a coding density of 8/9 (I=8, J=9) and constraint set of (0,4,4), inserting one uncoded byte between each coded byte (M=1) results in a coding density of 16/17 which is 5.88% greater than the original 8/9 coding density. The constraint set is also increased to (0,12,8), where k is increased by 8 and l is increased by 4. The coding density is significantly increased without increasing the error propagation, since the size of the coded block is not increased.

20 Claims, 3 Drawing Sheets

APPARATUS AND METHOD FOR INCREASING DENSITY OF RUN LENGTH LIMITED BLOCK CODES WITHOUT INCREASING ERROR PROPAGATION

FIELD OF THE INVENTION

The present invention relates to the field of magnetic media storage, and more particularly to techniques for increasing the density of run-length-limited (RLL) block codes used in magnetic media storage devices.

BACKGROUND OF THE INVENTION

Data detection in conventional prior art peak-detection magnetic recording channels is achieved by first differentiating an analog signal and then processing the differentiated signal with a zero-crossing detector to determine the presence or absence of a zero-crossing event within a detection window. Data detection in a digital communication channel is generally based on periodically sampling the amplitude of the transmitted signal. In the absence of noise or other imperfections, the zero crossings of derivative signals in peak detection occur only at times corresponding to clock times at which a transition was written. Enhancements, such as precompensation and run-length limited codes have extended the performance of peak detection systems.

Run-length limited block codes (RLL), in particular, have been responsible for significant improvements in system performance. Run length limited block codes intended for use in hard disk drives typically have a coding density of I/J, where I is an integer number which is ordinarily an integer multiple or submultiple of 8, and J is a larger integer. I data bits are coded into J binary channel symbols or "channel bits". The constraint that I is a multiple or submultiple of 8 arises from the outer, error correcting code, which works on a byte-by-byte basis. That is, the number of bits in error within a byte is either zero or greater than zero, and how much greater than zero is not important to the error correcting code. Decoding a block of channel bits which contains one or more error bits contaminates the entire block. Accordingly, keeping block boundaries aligned with byte boundaries reduces the number of contaminated bytes.

Other important parameters of these codes are the run length constraints. These are usually labeled (d,k,l), where d is the minimum number of zeroes between ones, k is the maximum number of zeroes between ones, and l is the maximum number of zeroes between ones in the odd/even substrings. For all high density codes, d=0, while the k constraint ensures sufficient transitions for timing recovery and AGC purposes. The l constraint avoids quasi-catastrophic sequences which would reduce the effectiveness of maximum likelihood (ML) detectors.

Attempts have been made in the prior art to increase coding densities of RLL block codes, however, the error propagation has also increased. For example, codes based on two byte blocks, having density 16/17 and constraint set: (0,6,6) are possible, but the error propagation of such codes is less than desirable, since the code length is two bytes. These codes would convert each channel bit error to two bytes, making it far more likely that the error correcting outer code would be overloaded at a given noise level. Also, codes based on two byte blocks would require extremely large "codebooks". In addition, codes which work on only one byte at a time, with no memory of previous bytes, like the one described above, convert each channel bit error with only a single error byte. It is therefore an object of the present invention to address some of the deficiencies of the prior art and provide a technique for increasing the density of run length limited block codes without increasing the associated error propagation.

SUMMARY OF THE INVENTION

The present invention is an apparatus and method for increasing the density of run-length-limited (RLL) block codes without increasing error propagation. By inserting a number of uncoded bytes (M) between each coded byte, the coding density is thereby increased. Starting with an RLL code which converts I user bits to J channel bits, a number (M) of uncoded bytes may be inserted between each coded byte. The resulting density is: (I+8M)/(J+8M), wherein the resulting k constraint, of the (d,k,l) constraints is increased by 8M, and the resulting l constraint is increased by 4M. For example, starting with an RLL code having a coding density of 8/9 (I=8, J=9) and constraint set of (0,4,4), inserting one uncoded byte between each coded byte (M=1) results in a coding density of 16/17 which is 5.88% greater than the original 8/9 coding density. The constraint set is also increased to (0,12,8), where k is increased by 8 and l is increased by 4. As can be seen, the coding density is significantly increased without increasing the error propagation, since the size of each coded block is still one byte.

In a preferred embodiment of a system for increasing coding density, a shift register has an input from a serial bit stream. The shift register is coupled to a block encoder for producing coded blocks of data for run-length-limited block codes. The output from the block encoder is coupled to a parallel to serial converter. The output of the parallel to serial converter is coupled to a multiplexer as a second input from the input serial bit stream. A controller coupled to a system clock controls the data flow through the system. Input lines from the multiplexer are alternately selected so as to selectively interleave uncoded data blocks in between coded data blocks, thereby increasing the density of the run-length-limited block codes.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1:
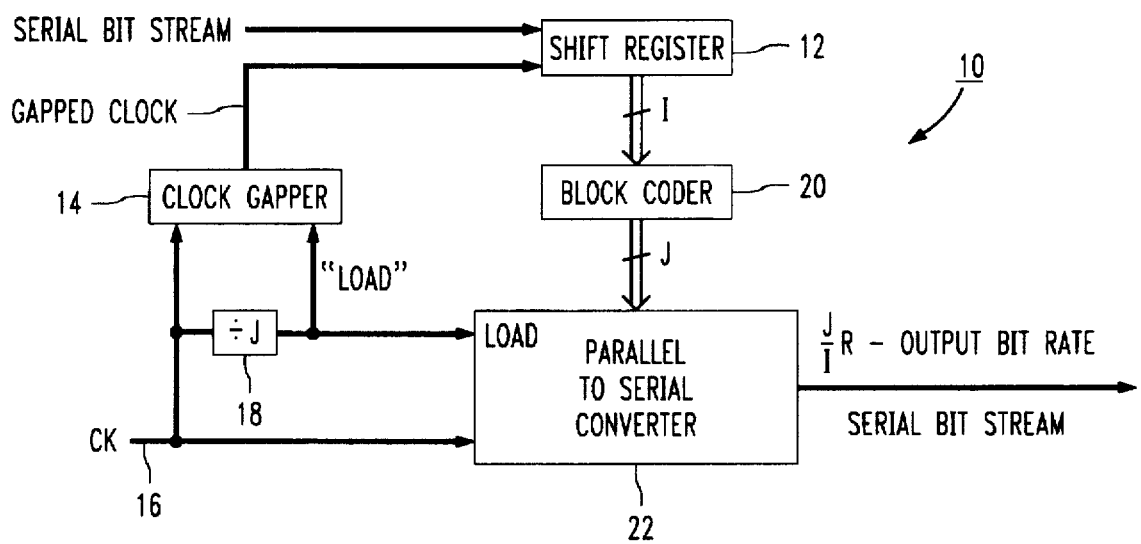
FIG. 1 shows a block diagram of a prior art run-length-limited block coding scheme.

The present invention is an apparatus and method for increasing the density of run length limited (RLL) block codes without increasing error propagation. Run length limited block codes intended for use in hard disk drives typically have a coding density of I/J, where I is the symbol length of the outer error correction code which is typically 8 bits, and J is a larger integer. I data bits are coded into J binary channel symbols or "channel bits". Referring to FIG. 1, a typical prior art encoding device 10 is shown for encoding data into run-length-limited block codes. FIG. 1 shows data, for example a serial bit stream entering a shift register 12. The output of a clock gapping device 14 is coupled to the shift register 12 as a second input. The clock gapping device 14 receives inputs from a system clock 16 and a divide-by-J counter 18, which enables the clock gapping device to provide a gapped clock signal for controlling the timing for the input to the shift register.

The output of the shift register is coupled to a RLL block encoder 20. The block encoder, as is known, may be comprised of combinatorial logic and/or a ROM look-up table to enable the output of any of a predetermined number of block codes. The output of the block encoder is coupled to a parallel to serial converter 22. As can be seen, the block encoder receives "I" parallel bits on a parallel data bus from the shift register 12 and outputs "J" encoded parallel bits to the parallel to serial converter 22. The parallel to serial converter 22 also receives input signals from the clock (CK) and divide-by-J counter 18 (load signal) to control the timing of the serial bit stream to (load data) and from the parallel to serial converter 22, which includes the encoded blocks of data.

Figure 2:
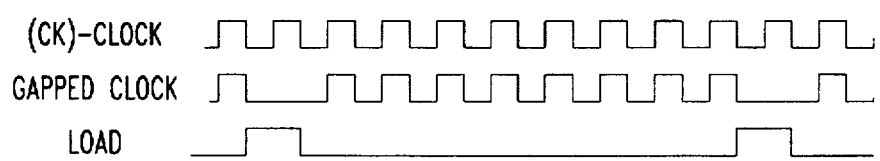
FIG. 2 shows a timing diagram associate with the encoding scheme of FIG. 1.

FIG. 2 shows a timing diagram associated with the encoder 10 of FIG. 1, wherein I=8 and J=9. The system clock CK produces a series of standard pulses at a predetermined frequency. The clock gapping device 14 produces an output signal or gapped clock signal which essentially mimics the clock signal CK with the exception that a gap or non-pulse is included in the pulse sequence at an interval of every J pulses. In this case a gap is produced on the ninth. The third signal is a "load" signal produced by the divide-by-J counter for loading of the parallel to serial converter 22. A single load pulse is produced on the trailing edge of every J pulses. The timing signals input to the parallel to serial converter produce a serial bit stream having an output bit rate of (J/I)R, where R is the bit rate of the serial bit stream input to the shift register 12.

The present invention improves upon the encoding scheme of FIG. 1 by inserting a number of uncoded bytes (M) between each coded byte to thereby increase the coding density. Starting with an RLL code with a block length (I) which is a multiple of 8, a number (M) of uncoded bytes may be inserted between each coded byte. The resulting density is: (I+8M)/(J+8M), wherein the resulting k constraint, of the (d,k,l) constraints is increased by 8M, and the resulting l constraint is increased by 4M. For example, starting with an RLL code having a coding density of 8/9 and constraint set of (0,4,4), inserting one uncoded byte between each coded byte (M=1) results in a coding density of 16/17 which is 5.88% greater than the original 8/9 coding density. The constraint set is also increased to (0,12,8), where k is increased by 8 and l is increased by 4. As can be seen, the coding density is significantly increased without increasing the error propagation, since the size of each coded block is still one byte.

Figure 3:
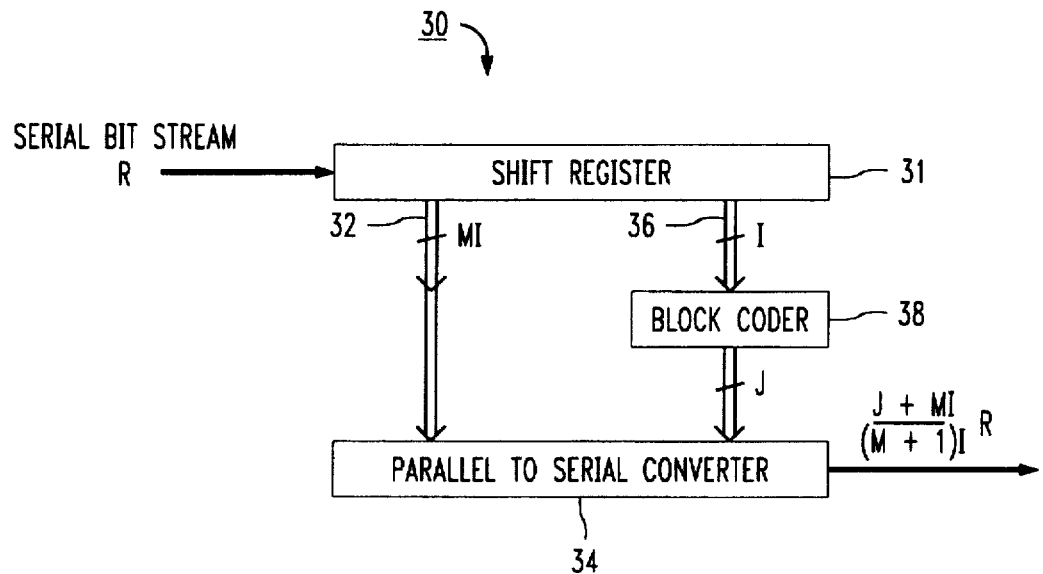
FIG. 3 shows a block diagram for implementation of the present invention run-length limited coding scheme.

FIG. 3 shows a block diagram of an encoder 30 for implementation of the present invention coding scheme. A serial bit stream having a bit rate R is shown as an input to a shift register device 31. The shift register 31 includes two parallel outputs. The first output 32 is a parallel data path of width MI which is input directly to a parallel to serial converter 34. The second output 36 is a parallel data path of width I which is input to a block encoder 38 of the type described with respect to FIG. 1, and which may include for example, combinatorial logic and/or a ROM look-up table for assigning codes. The block encoder 38 encodes the I data bits from the shift register 31 and produces a "J" bit width output. The uncoded byte and the coded output are assembled side by side in the parallel to serial converter 39 and output together as part of a serial bit stream. The resulting assembled data within the parallel to serial converter will have a density of (M+1)I/(J+MI), wherein a serial bit stream may be output at a rate of (J+MI)R/(M+1)I where R is the input bit rate. The apparatus of FIG. is 3 is thus operable to insert any number of uncoded bytes (MI) between block coded data J.

Figure 4:
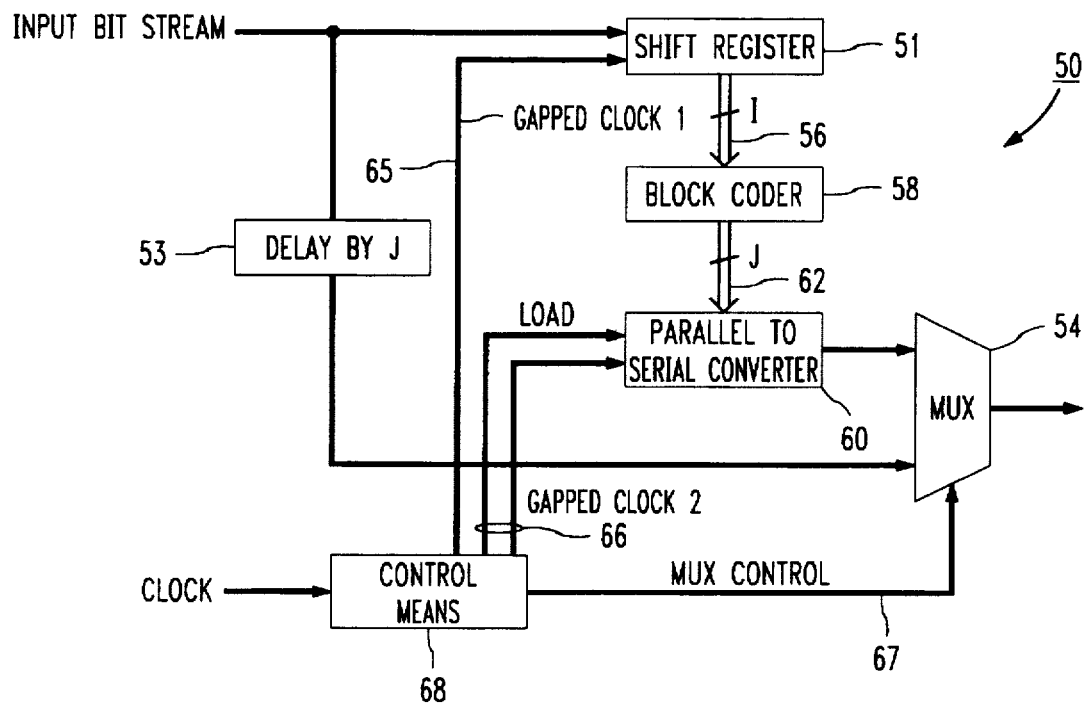
FIG. 4 shows a detailed description of one preferred embodiment of a system for implementing the present invention run-length limited coding technique.

Referring to FIG. 4, there is shown a second preferred embodiment of an encoder 50 for increasing the density of block codes according to the present invention. In a similar fashion to the embodiment described in FIG. 1, a shift register 51 has an input line 52 coupled thereto which carries an input bit stream of data. The same input line 52 is also coupled to the input of a multiplexer device 54, through a delay producing device 53. A data bus 56 of width I is coupled to an RLL block encoder 58 of the type previously described. An output of the block encoder 58 is coupled to a parallel to serial converter 60 through a data bus 62 of width J which carries the encoded block.

Control lines 65, 66, 67 from a control device 68 are coupled to the shift register 51, parallel to serial converter 60 and the multiplexer 54, respectively. The control device 68, as would understood by one skilled in the art, may included a series of specific timing devices and/or a processor for issuing data control commands according to a predetermined program. The control device 68 provides a first gapped clock signal to the shift register 51 which is similar to the gapped clock described in FIG. 1 and which controls the data flow into the shift register and to the block encoder. A "load" signal from the control device is applied to the parallel to serial converter 60, as in FIG. 1, along with a second gapped clock signal. The load and second gapped clock signal control data flow to and from the parallel to serial converter to the multiplexer. One or more control lines 67 from the control device 68 are also coupled to the multiplexer 54. By properly controlling the inputs of the multiplexer 54, uncoded bytes may be inserted between block codes to form a hybrid block code of increased density. As can be seen, since the input bit stream has a direct connection to the multiplexer 54, the input bit stream may be manipulated from the control device 68 to insert any number of uncoded bytes in between coded bytes. As described previously, the present invention enables the density of the run-length-limited block codes to be significantly increased, but without the cost of increased error propagation.

Figure 5:
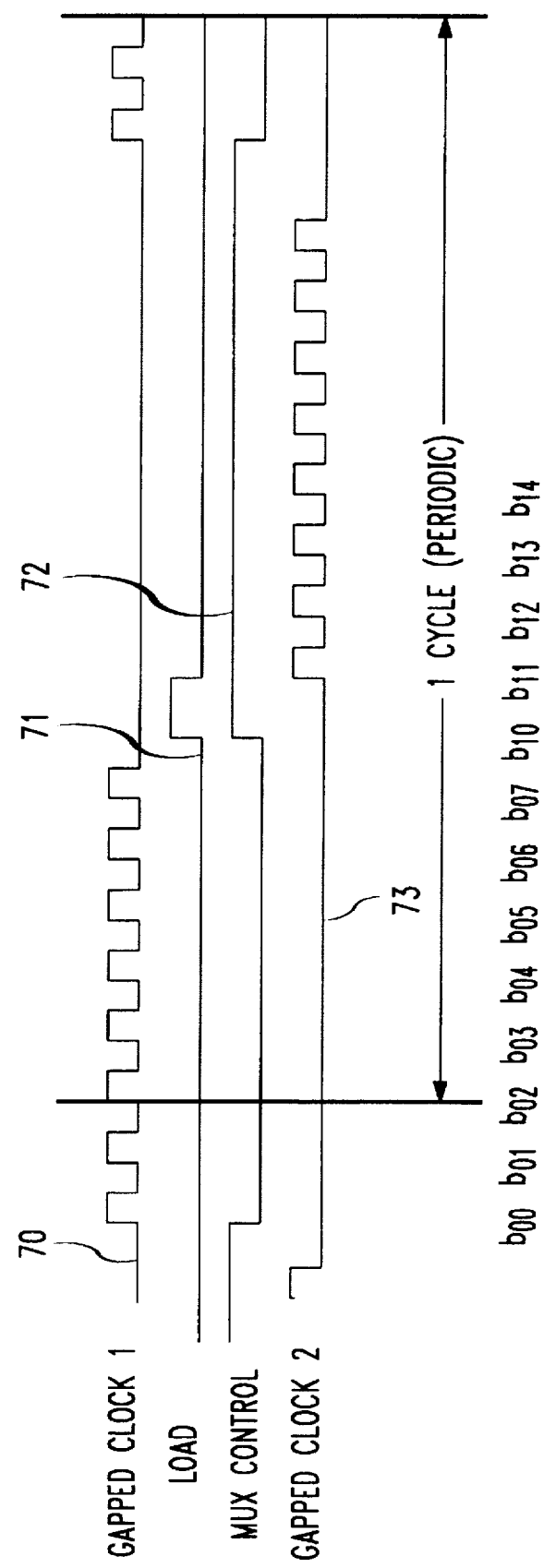
FIG. 5 shows a timing diagram for control signals associated with the embodiment of FIG. 4.

FIG. 5 shows a timing diagram for the preferred embodiment of FIG. 1, wherein the parameters I=8, J=9 and M=1. FIG. 5 shows the waveforms of four of the control (clock) signals issued from the control device for a single cycle of an extended block code. These signals include the first gapped clock 70, the load signal 71, the multiplexer control line signal 72 and the second gapped clock 73. As can be seen the second gapped clock signal 73 becomes active on the trailing edge of the load signal 71 and is only active during the gap in the first gapped clock signal. The multiplexer control signal 72 goes to a high condition on the leading edge of the load signal 71, wherein the load signal emanates from a counter having a periodicity of (J+IM). A high condition on the multiplexer control signal 72 enables selection of the coded data from the parallel to serial converter 60, which is then outputted from the multiplexer 54. A low condition on the multiplexer control signal line 72 enables selection of the uncoded data which is meant to be inserted or interleaved between the coded block code data.

In the preferred embodiment of the invention, where I=8, J=9 and M=1, it can be seen that the K constraint (global run) is increased by 8, while L (even/odd 0 run) is increased by 4. At the same time a density of 16/17 is achieved, which is an increase of 5.88%. All of the above is accomplished without any increase in error propagation. It will be understood that the value for M may take on values other than one, however, in the preferred implementation, M would most likely take on the value of one.

Decoding for the present invention coding scheme will take place in essentially a reverse order from that of the encoding process. As will be understood by one skilled in the art, the decoder would utilize an associated decoding circuit in place of the block encoder to accomplish the decoding process.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An apparatus for producing from binary data a runlength-limited block code of preselectable density for encoding of data on a magnetic media, said apparatus comprising:

receiving means coupled to an input bit stream for receiving said binary data;

encoding means coupled to said receiving means for encoding selected portions of said binary data into block encoded data;

control means coupled to said input bit stream operable to select and interleave a predetermined uncoded portion of said binary data between said block encoded data; and output means coupled to said encoding means and said control means, said output means operable to output said predetermined uncoded portion of said binary data between said block encoded data, thereby forming said run-length limited block code of said preselectable density.

2. The apparatus of claim 1, wherein I is the number of bits in an uncoded block of data, J is the number of channel bits in an encoded block and M is a number of uncoded blocks to be inserted between said encoded blocks, said output means operable to produce a block code with said preselectable density being $I/(J+MI)$.

3. The apparatus of claim 2, wherein said block codes have runlength constraints of (d,k,l), where d is the minimum number of zeroes between ones, k is the maximum number of zeroes between ones and l is the maximum number of zeroes between ones in odd/even substrings, wherein said k constraint is increased by 8M and said l constraint is increased by 4M when compared to an original non-interleaved block code.

4. The apparatus of claim 2, wherein M has a value of 1 and said preselectable density is 16/17 with a constraint set of (0,12,8).

5. The apparatus of claim 1, wherein said receiving means includes a shift register device.

6. The apparatus of claim 4, wherein said output means includes a parallel to serial converter.

7. The apparatus of claim 6, wherein said control means includes a multiplexer for enabling interleaving of said uncoded data with said block coded data.

8. The apparatus of claim 7, wherein said control means is operable to output a first and second gapped clock signal for controlling data flow of said shift register and parallel to serial converter, respectively, said control means further adapted to output a multiplexer control signal for selectively alternating inputs of said multiplexer between said uncoded and coded data.

9. The apparatus of claim 6, wherein said parallel to serial converter includes a direct connection to said shift register for receiving said uncoded data.

10. A coding apparatus for use in a storage system where I is the number of bits in an uncoded block of data and J is the number of channel bits in a coded block of data, said apparatus comprising:

means for inputting I bits of binary data at a time;

means for encoding selected bytes of said binary data into a coded block; and means for interleaving a selected multiple of said I bits of uncoded binary data with said encoded block code to thereby form a runlength limited block code of preselectable density without increasing error propagation.

11. The apparatus of claim 10, wherein said means for inputting includes a shift register coupled to a serial bit stream.

12. The apparatus of claim 11, wherein said means for interleaving includes a parallel to serial converter coupled to control means, said control means adapted to select said uncoded data and generate timing signals for control of data flow to and from said shift register and parallel to serial converter.

13. The apparatus of claim 12, wherein said means for interleaving further includes a multiplexer to enable alternate output of said coded and uncoded data.

14. The apparatus of claim 12, wherein said parallel to serial converter is directly coupled to said shift register for receiving said uncoded data.

15. The apparatus of claim 10, wherein said apparatus produces an RLL block code having a density of $I/(I+MI)$.

16. The apparatus of claim 15, wherein M=1 and said coding density is 16/17 with a constraint set of (0,12,8).

17. A method for encoding binary data on a storage medium utilizing run-length-limited block codes, said method comprising the steps of:

receiving an input bit stream of said binary data;

encoding selected portions of said binary data into block encoded data;

interleaving a predetermined uncoded portion of said binary data between said block encoded data; and outputting said block encoded data together with said uncoded portion of block encoded data therebetween, to thereby form a run-length limited block code of increased density.

18. The method of claim 17, wherein I is the number of bits in an uncoded block of data, J is the number of channel bits in an encoded block and M is a number of uncoded bytes to be inserted between said encoded blocks, further including the step of to producing a block code with a preselectable density of $I/(J+MI)$.

19. The method of claim 18, wherein M has a value of 1 and said preselectable density is 16/17 with a constraint set of (0,12,8).

20. The method of claim 18,, wherein said block codes have runlength constraints of (d,k,l), where d is the minimum number of zeroes between ones, k is the maximum number of zeroes between ones and l is the maximum number of zeroes between ones in odd/even substrings, wherein said k constraint is increased by 8M and said l constraint is increased by 4M when compared to an original non-interleaved block code.

* * * * *